(12) United States Patent
Vasudeva et al.

(10) Patent No.: US 7,766,585 B2
(45) Date of Patent: Aug. 3, 2010

(54) IRREGULAR-SHANK TOOLS AND DRIVERS THEREFOR

(75) Inventors: Kailash C. Vasudeva, Waterloo (CA); Satnam Singh, Waterloo (CA)

(73) Assignee: Team Fair Holdings Limited, Road Town (VG)

( * ) Notice: Subject to any disclaimer, the term of this patent is extended or adjusted under 35 U.S.C. 154(b) by 101 days.

(21) Appl. No.: 10/467,656

(22) PCT Filed: Feb. 8, 2002

(86) PCT No.: PCT/CA02/00134

§ 371 (c)(1),
(2), (4) Date: Aug. 11, 2003

(87) PCT Pub. No.: WO02/064295

PCT Pub. Date: Aug. 22, 2002

(65) Prior Publication Data

US 2004/0081523 A1    Apr. 29, 2004

(51) Int. Cl.
*B23B 31/107*    (2006.01)
*B23B 51/02*    (2006.01)

(52) U.S. Cl. .................. 408/226; 408/240; 279/22; 279/75; 279/905

(58) Field of Classification Search .......... 408/226, 408/239 R, 240; 279/69, 74, 75, 905, 22; *B23B 31/107*
See application file for complete search history.

(56) References Cited

U.S. PATENT DOCUMENTS

| 339,544 | A | * | 4/1886 | Graham | 408/226 |
|---|---|---|---|---|---|
| 1,112,349 | A | * | 9/1914 | Barnes | 279/74 |
| 1,921,695 | A | * | 8/1933 | Normand | 279/75 |
| 2,390,950 | A | * | 12/1945 | Lanfranconi | 408/226 |
| 2,468,874 | A | * | 5/1949 | Hawkins | 408/226 |
| 3,929,343 | A | * | 12/1975 | Wanner et al. | 279/81 |

(Continued)

FOREIGN PATENT DOCUMENTS

DE    676380    6/1939

(Continued)

OTHER PUBLICATIONS

Canadian Intellectual Property Office, Office Action for Canadian Patent Application No. 2,437,568, Jan. 30, 2009.

(Continued)

*Primary Examiner*—Eric A Gates
(74) *Attorney, Agent, or Firm*—Borden Ladner Gervais LLP; Jeffrey W. Wong

(57) ABSTRACT

A tool (1) has a distal operative portion and a proximal shank (2) with a mounting portion (3), for mounting the tool in a holder (10). A substantial portion of the mounting portion has a cross-sectional shape with at least one and fewer than six 60-degree segments thereof having segment ends joined by a flat surface (5). The holder has a distal axial aperture or mounting hole (12) for receiving the tool (1), the aperture having a cross-sectional shape which has 60-degree segments thereof having segment ends joined by a flat surface (13), but no more such flat surface segments than those corresponding to flat surface segments of the tool. The holder further has a ball-detent (21) mechanism or other locking mechanism for engaging the mounting portion (3) of the tool (1).

8 Claims, 10 Drawing Sheets

U.S. PATENT DOCUMENTS

| | | | |
|---|---|---|---|
| 4,002,347 A * | 1/1977 | Wanner et al. | 279/19.3 |
| RE31,755 E * | 12/1984 | Wanner et al. | 464/167 |
| 4,749,051 A * | 6/1988 | Larsson | 175/320 |
| 4,818,157 A * | 4/1989 | Kouvelis | 408/240 |
| 4,920,837 A | 5/1990 | Phillips | |
| 5,037,251 A * | 8/1991 | Roth | 408/222 |
| 5,421,682 A * | 6/1995 | Obermeier et al. | 408/226 |
| 5,427,482 A * | 6/1995 | Asano et al. | 408/240 |
| 5,624,214 A * | 4/1997 | Carroll | 408/226 |
| 5,833,405 A * | 11/1998 | Nielsen | 408/226 |
| 5,957,634 A * | 9/1999 | Carpinetti | 408/226 |
| 5,984,596 A * | 11/1999 | Fehrle et al. | 408/226 |
| 6,109,620 A * | 8/2000 | Roberts et al. | 279/143 |
| 6,193,242 B1 * | 2/2001 | Robison | 279/137 |
| 6,261,035 B1 * | 7/2001 | Moores et al. | 408/239 R |
| 6,379,089 B1 * | 4/2002 | Sugiura et al. | 408/204 |
| 6,398,466 B1 * | 6/2002 | Wheeler | 408/239 R |
| 6,474,656 B1 * | 11/2002 | Thomas | 279/30 |
| 6,572,311 B2 * | 6/2003 | Vasudeva | 408/226 |
| 6,695,321 B2 * | 2/2004 | Bedi et al. | 279/22 |
| 6,902,358 B2 * | 6/2005 | Thomas | 408/226 |
| 2001/0042964 A1 * | 11/2001 | Bedi et al. | 279/30 |
| 2002/0009341 A1 * | 1/2002 | Vasudeva | 408/226 |
| 2002/0009342 A1 * | 1/2002 | Vasudeva | 408/226 |
| 2004/0056435 A1 * | 3/2004 | Bedi et al. | 279/75 |

FOREIGN PATENT DOCUMENTS

| | | |
|---|---|---|
| DE | 680914 | 9/1939 |
| DE | 4316799 A1 * | 7/1994 |
| DE | 29705575 | 4/1998 |
| FR | 1021969 | 2/1953 |
| FR | 2408716 | 5/1990 |
| GB | 2270018 | 3/1994 |
| WO | 00/27574 | 5/2000 |

OTHER PUBLICATIONS

Canadian Intellectual Property Office, Office Action for Canadian Patent Application No. 2,437,568. Sep. 29, 2009.

* cited by examiner

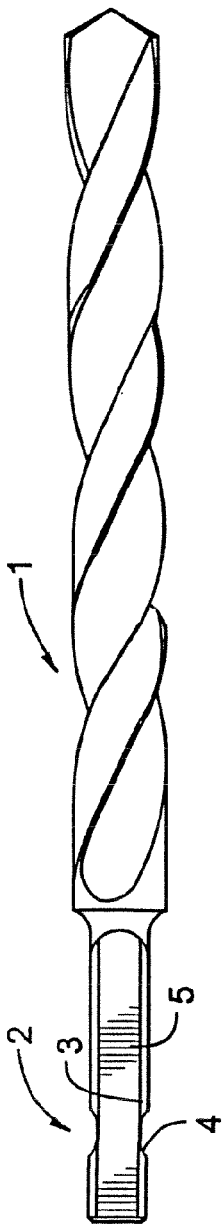
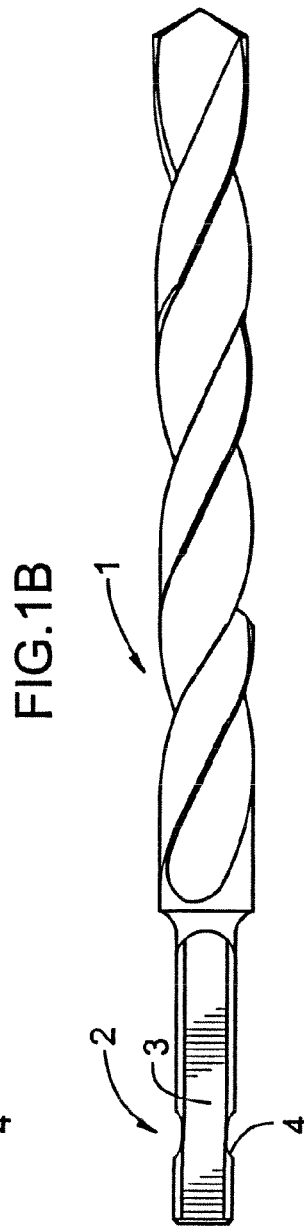
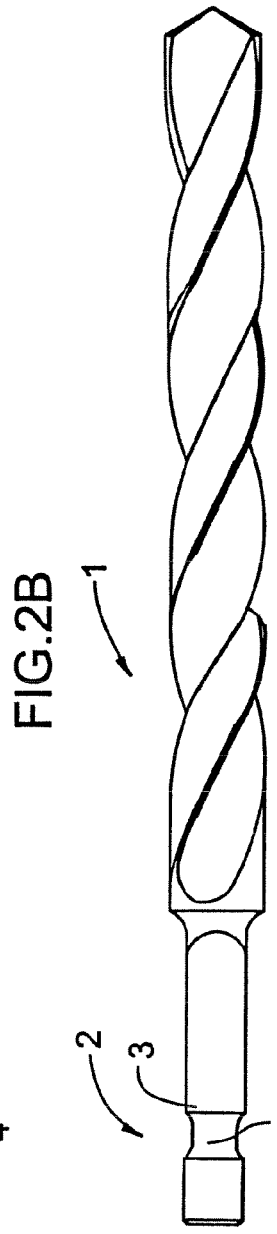
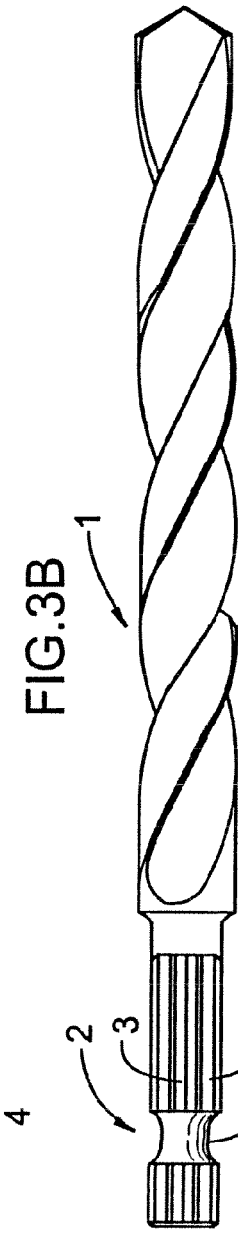
FIG.1B
FIG.2B
FIG.3B
FIG.4B
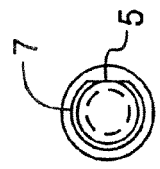
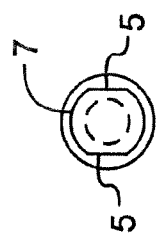
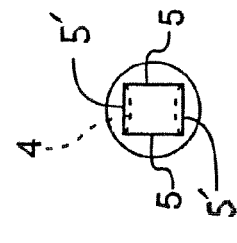
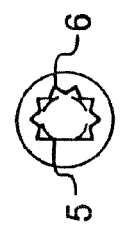
FIG.1A
FIG.2A
FIG.3A
FIG.4A

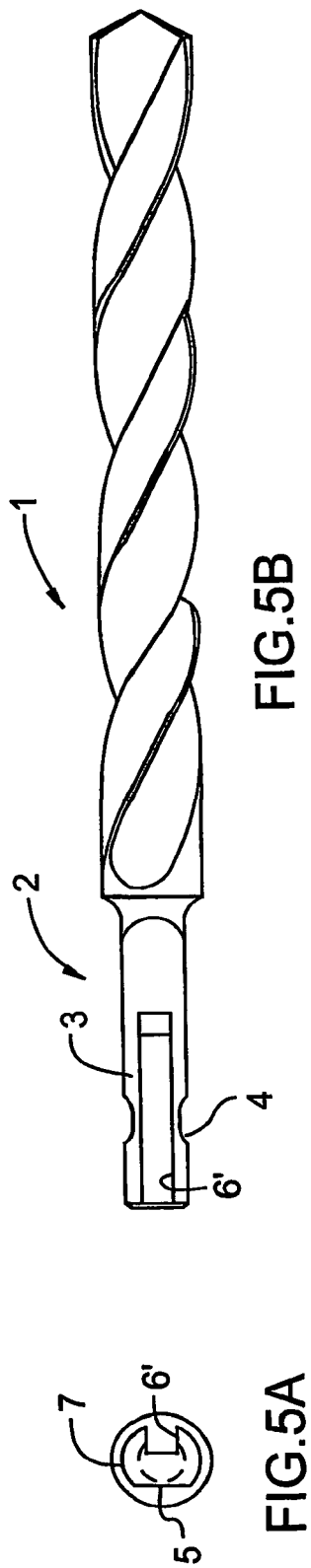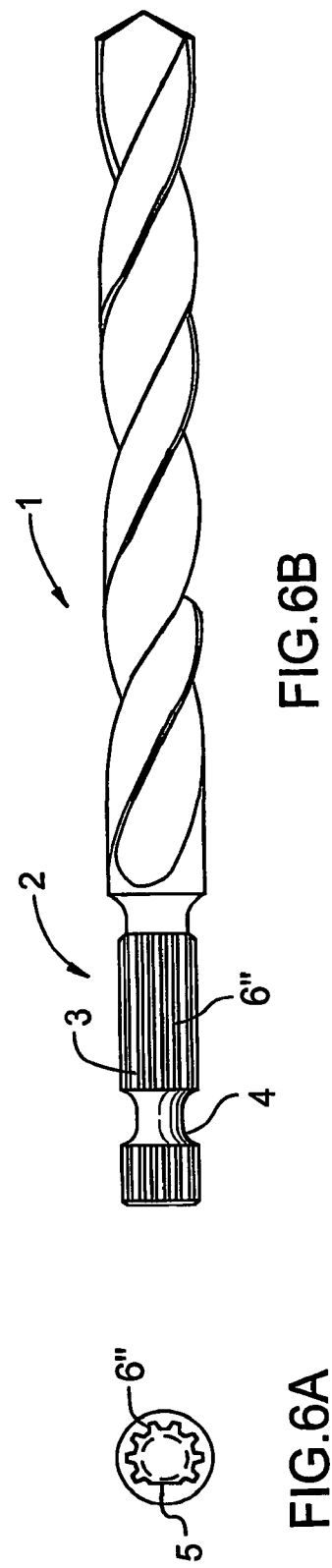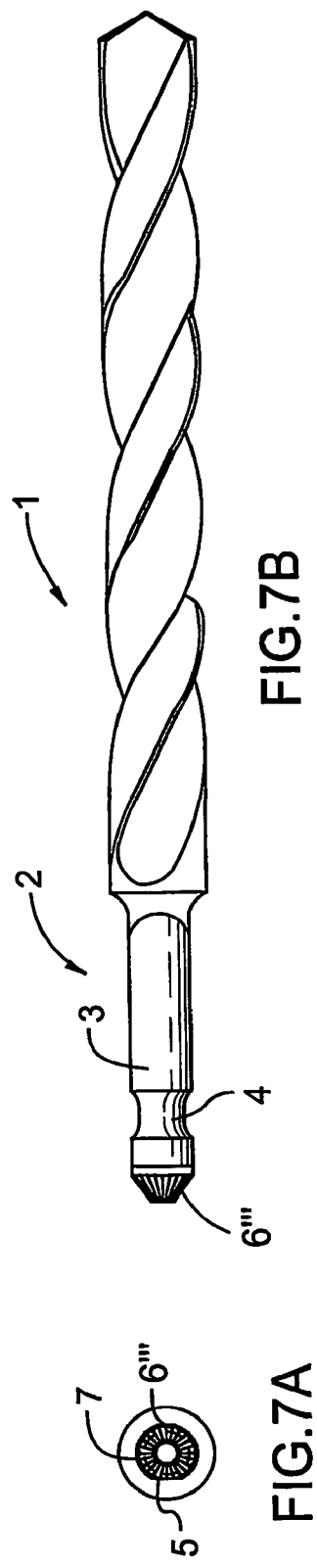

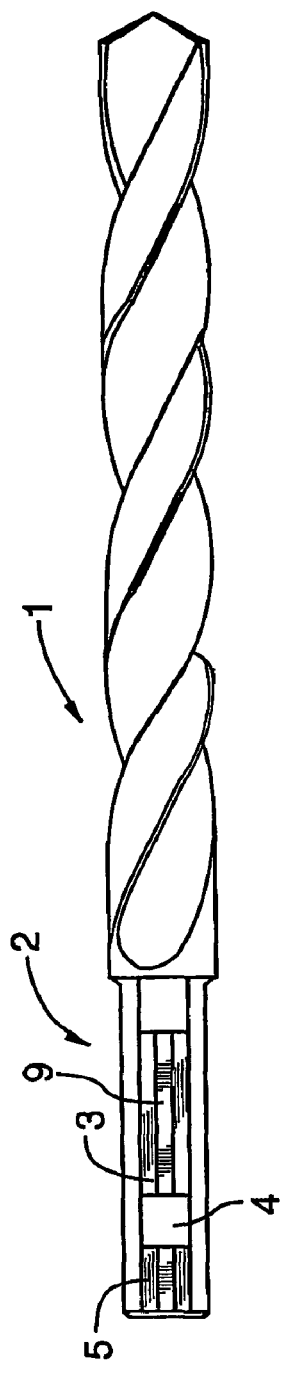
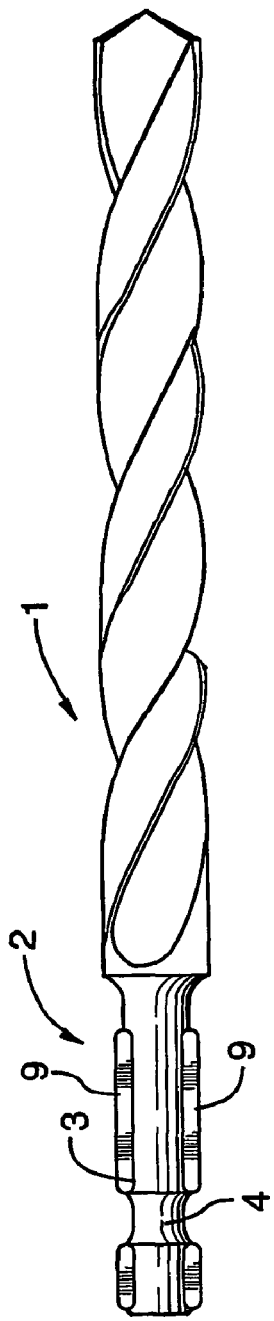
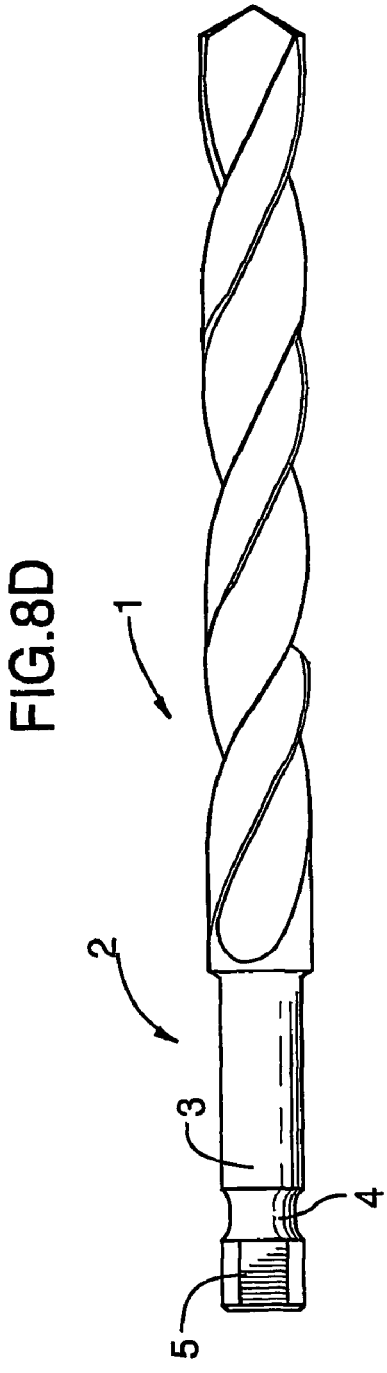
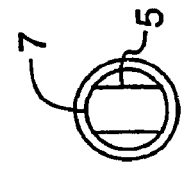
FIG.8B
FIG.8D
FIG.9B
FIG.8A
FIG.8C
FIG.9A

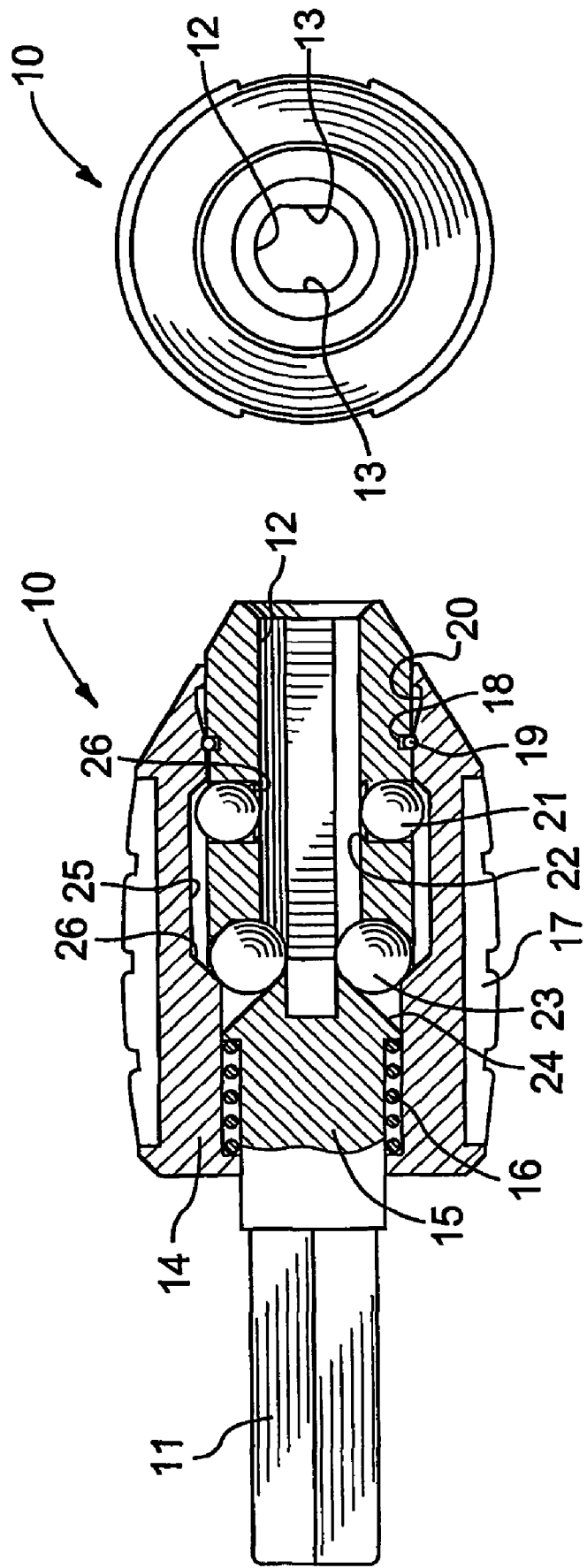

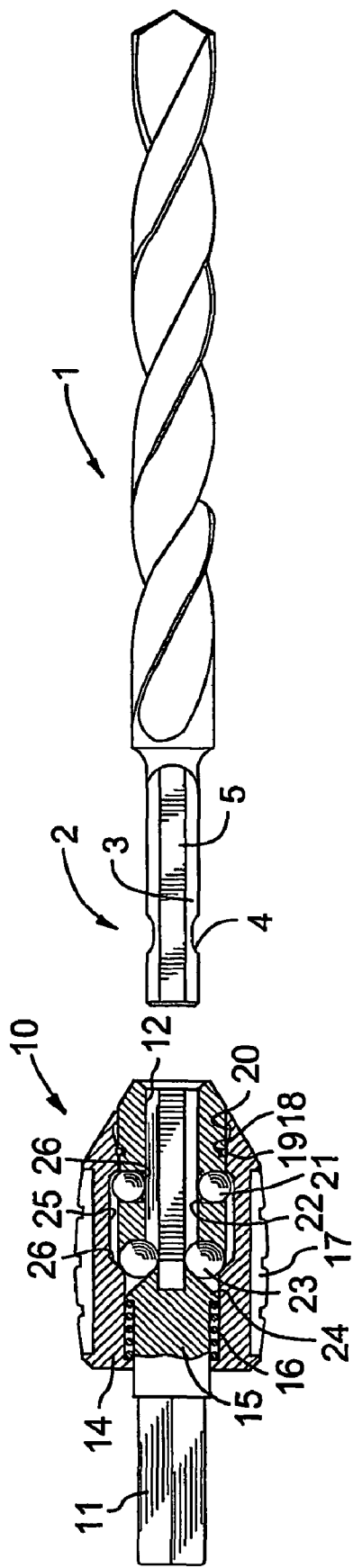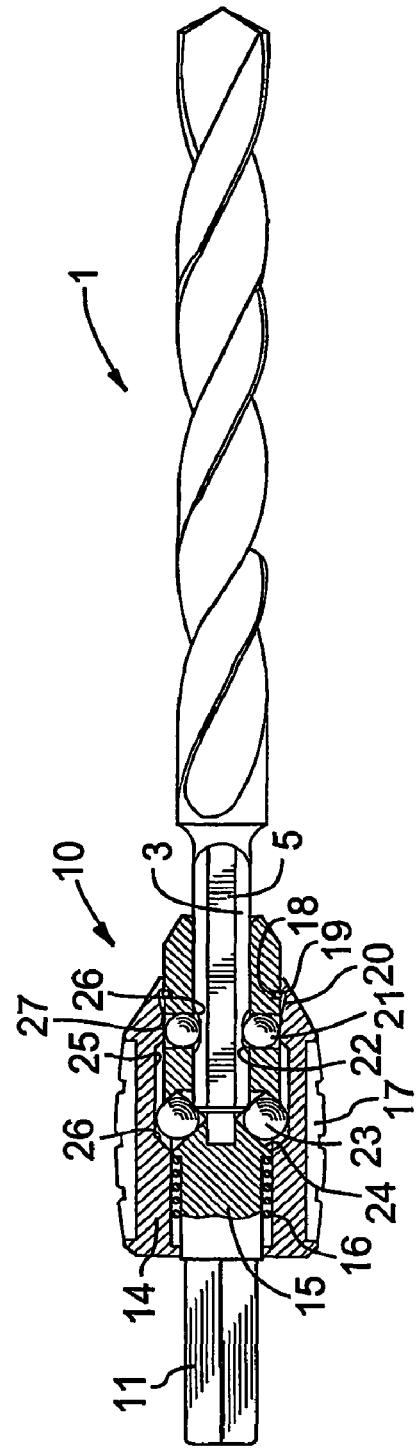
FIG.11A
FIG.11B

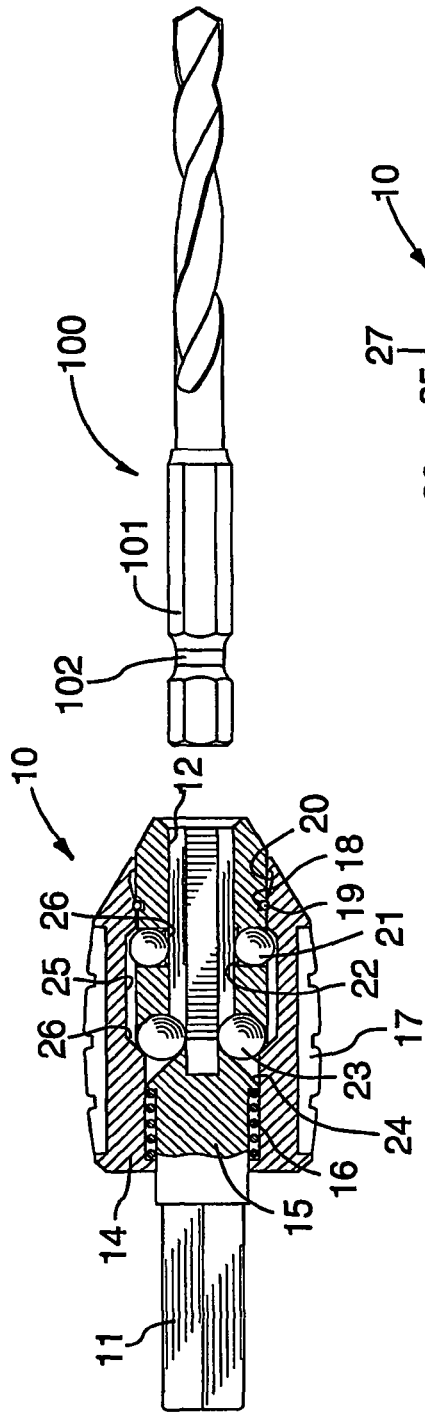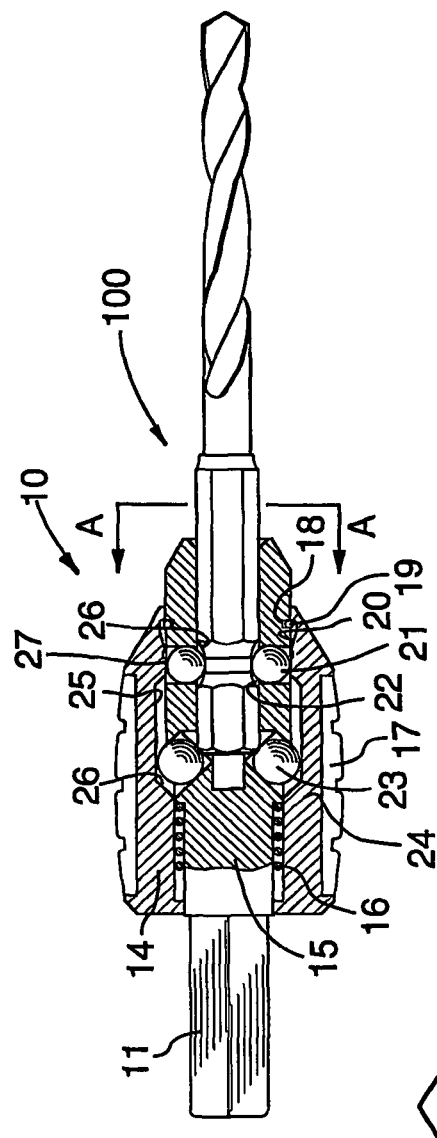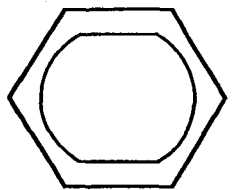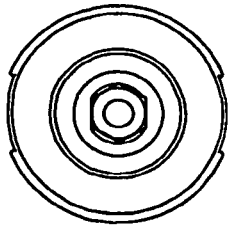
FIG.12A
FIG.12B
FIG.12C
FIG.12D

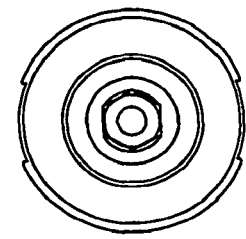
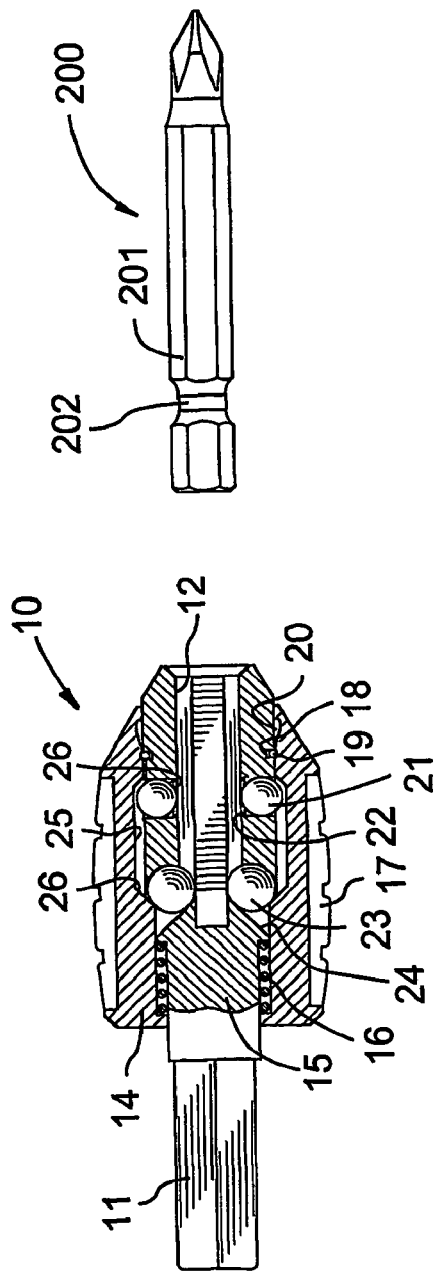
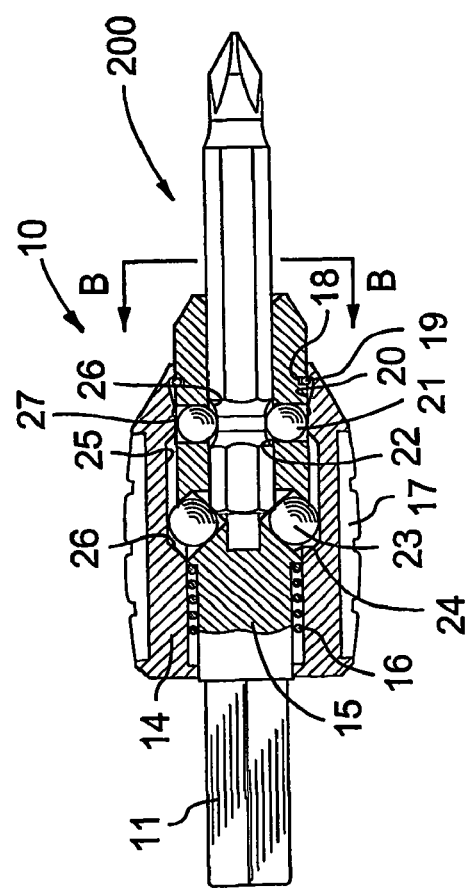

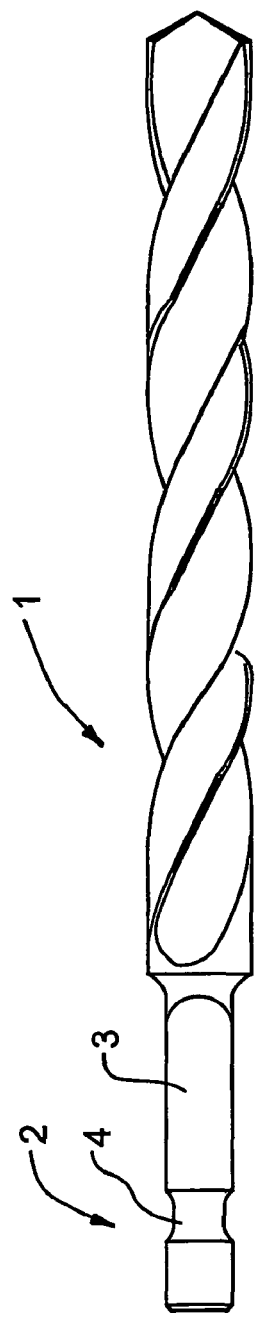
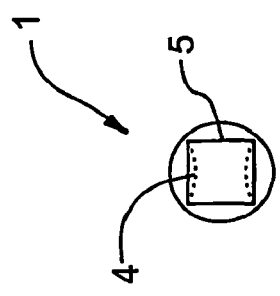
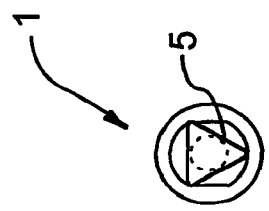
FIG.16A
FIG.17A
FIG.16B
FIG.17B

_US 7,766,585 B2_

IRREGULAR-SHANK TOOLS AND DRIVERS THEREFOR

TECHNICAL FIELD

This invention relates to tools such as drill bits, screwdriver bits, reamers, router bits, grinding wheels, spade bits, countersinks, mandrels, polishing tools, wheel brushes, wheel cutters and other tool accessories, and to driving tools for same, for example a drill or a screwdriver. In particular, the invention relates to tool configurations where the tool shanks have certain irregular (i.e. non-circular) shapes adapted to fit cooperative holder portions of the bit-driving tools.

DISCLOSURE OF INVENTION

It is an object of the invention to provide novel tools, and novel holders for those tools for mounting on or incorporation in a driving implement, such as a hand tool or a power tool, the holder having a mounting hole and a retaining/locking mechanism which accepts and securely holds a variety of tool shank mounting portions of different shapes. In the preferred embodiment of the tools, their cross-sections have at least one flat portion across at least a 60 degree segment of the tool shank, to provide sufficient torque transfer between the holder and the tool. The holder mounting hole has a number of flats ranging from one to five corresponding to the number of flat portions on the mounting portion of the tool, the flat sections of the hole being tied together by substantially circular sections. A holder according to the invention can securely mount and hold not only tools having mounting portions according to the invention, but also standard hex tool bits, such as drill bits and screwdriver bits.

In the invention, the tool has a distal operative portion and proximal shank with a mounting portion, for mounting the tool in the holder portion of the driving tool. A substantial portion of the mounting portion has a cross-sectional shape with at least one and fewer than six 60-degree segments thereof having segment ends joined by a flat surface. The holder has a distal axial aperture or mounting hole for receiving the tool, the aperture having a cross-sectional shape which has 60-degree segments thereof having segment ends joined by a flat surface, but no more such flat surface segments than those corresponding to flat surface segments of the tool.

In an alternative embodiment of the tool, the mounting portion thereof has a cross-sectional shape with at least one protrusion therefrom, adapted for engagement in at least one slot in aperture of the holder, or has at least one slot therein, adapted for engagement with at least one radially-inward protrusion in the aperture.

The invention encompasses not merely the tools, but also the tools and holders in combination.

The holder has locking means for engaging the mounting portion of the tool. The locking means either comprises manually operated engagement means for locking the mounting portion in the holder, for manually engaging the engagement means in a locking position after insertion of a tool in the holder, or automatically operated engagement means for locking the mounting portion in the holder, the engagement means automatically engaging in a locking position around the tool when the tool is inserted into the holder.

In a preferred embodiment, the tool has two said 60-degree segments having segment ends joined by a flat surface, the two segments being on opposite sides of the tool from each other.

Advantageously, a portion of the mounting portion has a circumferential groove extending at least partway around the mounting portion's circumference, adapted to receive locking means of a holder of a bit-driving tool, such as a locking ball of a ball-detent mechanism. The groove may extend completely around the circumference, or may be only in at least one of the flat surfaces. Alternatively, the groove may be in a surface of the mounting portion other than any of the flat surfaces. Any suitable ball-detent mechanism, combination ball detent and transition ball mechanism, or any other suitable locking means may be used, including some locking means perhaps not presently known. Non-limited examples of such locking means may be seen, for example, in U.S. Pat. Nos. 6,199,872, 5,470,180, 5,682,800 and 5,779,404, and in published international patent application no. PCT/CA00/00521. Thus it should be clearly appreciated that the invention resides in the novel tools, and in the combination of the tools and appropriate holders, rather than in the holders themselves.

BRIEF DESCRIPTION OF DRAWINGS

In order that the invention may be more clearly understood, preferred embodiments thereof will now be described in detail by way of example, with reference to the accompanying drawings, in which:

FIG. 1A is an end view of a first embodiment of a tool having a mounting portion of a shank according to the invention, FIG. 1B is a side view of the tool of FIG. 1A, FIG. 2A is an end view of a second embodiment of a tool having a mounting portion of a shank according to the invention, FIG. 2B is a side view of the tool of FIG. 2A, FIG. 3A is an end view of a third embodiment of a tool having a mounting portion of a shank according to the invention, FIG. 3B is a side view of the tool of FIG. 3A, FIG. 4A is an end view of a fourth embodiment of a tool having a mounting portion of a shank according to the invention, FIG. 4B is a side view of the tool of FIG. 4A, FIG. 5A is an end view of a fifth embodiment of a tool having a mounting portion of a shank according to the invention, FIG. 5B is a side view of the tool of FIG. 5A, FIG. 6A is an end view of a sixth embodiment of a tool having a mounting portion of a shank according to the invention, FIG. 6B is a side view of the tool of FIG. 6A, FIG. 7A is an end view of a seventh embodiment of a tool having a mounting portion of a shank according to the invention, FIG. 7B is a side view of the tool of FIG. 7A, FIG. 8A is an end view of an eighth embodiment of a tool having a mounting portion of a shank according to the invention, FIG. 8B is a side view of the tool of FIG. 8A, FIG. 8C is an end view of a variation of the tool of FIG. 8A, FIG. 8D is a side view of the tool of FIG. 8C, FIG. 9A is an end view of a ninth embodiment of a tool having a mounting portion of a shank according to the invention, FIG. 9B is a side view of the tool of FIG. 9A, FIG. 10A is a sectioned side view of a first embodiment of a holder according to the invention, FIG. 10B is an end view of the holder of FIG. 10A, FIG. 11A is a partially sectioned side view of a holder according to the invention in position for receiving a tool of FIGS. 2A and 2B, FIG. 11B is a partially sectioned side view of the holder and tool of FIG. 11A, showing the mounted tool inside the holder, FIG. 12A is a partially sectioned side view of a holder according to the invention in position for receiving a standard hex cross-section tool of known art (a drill bit), FIG. 12B is a partially sectioned side view of the holder and tool of FIG. 12A, showing the mounted tool inside the holder, FIG. 12C is an end view of the holder and tool of FIG. 12B as seen from line A-A, showing the mounted tool inside the holder, FIG. 12D is an end view of the axial opening of the holder, FIG. 13A is a partially sectioned side view of a holder according to the invention in position for receiving a further type of standard hex cross-section tool of known art (a screwdriver bit), FIG. 13B is a partially sectioned side view of the holder and tool of FIG. 13A, showing the mounted tool inside the holder, FIG. 13C is an end view of the holder and tool of FIG. 13B as seen from line B-B, showing the mounted tool inside the holder, FIG. 16A is a side view of a tenth embodiment of a tool having a mounting portion of a shank according to the invention, FIG. 16B is an end view of the tool of FIG. 16A, FIG. 17A is a side view of an eleventh embodiment of a tool having a mounting portion of a shank according to the invention, FIG. 17B is an end view of the tool of FIG. 17A.

BEST MODES FOR CARRYING OUT THE INVENTION

Figure 14:
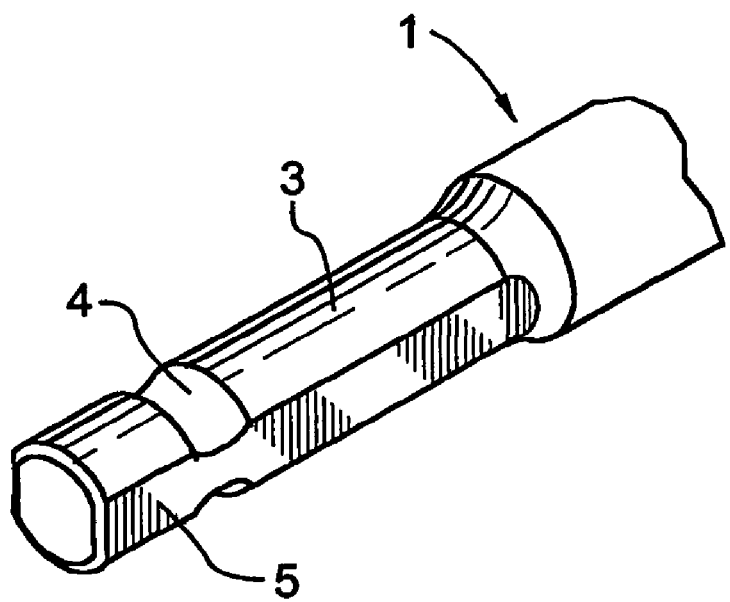
FIG. 14 is a perspective view of a mounting portion according to one embodiment of the invention.

FIGS. 1A to 9B show different embodiments of mounting portions of tool shanks according to the invention. The tool is shown as a drill bit, but any tool having a shank with a mounting portion can be used. Thus, any tools such as drill bits, screwdriver bits, reamers, router bits, grinding wheels, spade bits, countersinks, mandrels, polishing tools, wheel brushes, wheel cutters etc. are suitable for being provided with mounting portions according to the invention.

In FIGS. 1A and 1B a first embodiment of a mounting portion 3 of a shank 2 of a tool 1 is shown. The shank is generally circular in cross-section 7, and has one flat surface 5, which corresponds in width to a 60 degree section of the shank. An optional retention groove 4 is arranged towards the outer end of the mounting portion, for cooperation with locking means of a holder (described later).

A second embodiment of a mounting portion 3 of a shank 2 of a tool 1 is shown in FIGS. 2A and 2B. This is the embodiment presently preferred by the applicants. It is very similar to the first embodiment, but has two flat portions 5 arranged opposite each other on the shank. The shank is generally circular in cross-section 7. An optional retention groove 4 is arranged towards the outer end of the mounting portion.

A third embodiment of a mounting portion 3 of a shank 2 of a tool 1 is shown in FIGS. 3A and 3B. The shank is generally rectangular in cross-section, having two first flat portions 5 arranged opposite each other on the shank and two second generally flat portions 5' connecting the first flat portions. Each first flat portion 5 corresponds in width to a 60 degree section of the shank. An optional retention groove 4 is arranged towards the outer end of the mounting portion.

FIGS. 4A and 4B show a fourth embodiment of a mounting portion 3 of a shank 2 of a tool 1. The shank is generally circular in cross-section, with knurles/splines 6 arranged along at least a substantial portion of the mounting portion. The knurles/splines are arranged to cooperate with special tool holders having a correspondingly shaped hole, for enhanced torque transfer between holder and tool. The shank has one flat surface 5, which corresponds in width to a 60 degree section of the shank. An optional retention groove 4 is arranged towards the outer end of the mounting portion.

FIGS. 5A and 5B show a fifth embodiment of a mounting portion 3 of a shank 2 of a tool 1. The shank is generally circular in cross-section 7, with a keyway 6' arranged along at least a substantial portion of the mounting portion. The keyway is arranged to cooperate with special tool holders having a correspondingly shaped hole, for enhanced torque transfer between holder and tool. The shank has one flat surface 5, which corresponds in width to a 60 degree section of the shank. An optional retention groove 4 is arranged towards the outer end of the mounting portion.

FIGS. 6A and 6B show a sixth embodiment of a mounting portion 3 of a shank 2 of a tool 1. The shank is generally circular in cross-section, with gear teeth 6" arranged along at least a substantial portion of the mounting portion. The gear teeth are arranged to cooperate with special tool holders having a correspondingly shaped hole, for enhanced torque transfer between holder and tool. The shank has one flat surface 5, which corresponds in width to a 60 degree section of the shank. An optional retention groove 4 is arranged towards the. outer end of the mounting portion.

FIGS. 7A and 7B show a seventh embodiment of a mounting portion 3 of a shank 2 of a tool 1. The shank is generally circular in cross-section 7, with bevelled gear teeth 6'" arranged at the proximal end of the mounting portion. The bevelled gear teeth are arranged to cooperate with special tool holders having a correspondingly shaped hole, for enhanced torque transfer between holder and tool. The shank has one flat surface 5, which corresponds in width to a 60 degree section of the shank. An optional retention groove 4 is arranged towards the outer end of the mounting portion.

FIGS. 8A to 8D show an eighth embodiment of a mounting portion 3 of a shank 2 of a tool 1. The shank is generally circular in cross-section 7. The shank has two flat surfaces 5, which correspond in width to a 60 degree section of the shank. Each flat surface has a protruding wing 9 arranged on it, substantially in the middle of the flat surface and running longitudinally along at least a portion of the mounting portion 3. The wings are arranged to cooperate with special tool holders having a correspondingly shaped hole, for enhanced torque transfer between holder and tool. An optional retention groove 4 is arranged towards the outer end of the mounting portion, and is either arranged only on the flat surfaces 5 (as shown in FIG. 8B) or around the entire circumference of the shank (as shown in FIG. 8D).

FIGS. 9A and 9B show a ninth embodiment of a mounting portion 3 of a shank 2 of a tool 1. The shank is generally circular in cross-section 7 along a major portion of the shank, with flat surfaces 5 arranged at only the proximal end of the mounting portion. The flat surfaces are arranged to cooperate with special tool holders having a correspondingly shaped hole, for enhanced torque transfer between holder and tool. The flat surfaces 5 correspond in width to a 60 degree section of the shank. An optional retention groove 4 is arranged towards the outer end of the mounting portion.

FIGS. 10A and 10B show a holder 10, which accepts tools having shanks as previously described in FIGS. 1A to 9B. The invention in its broadest aspect is in no way limited to this particular holder, or to any specific holder. The holder comprises an elongate connector means 15 and an outer sleeve 14, the sleeve and the parts it operates constituting manually operable engagement means for locking the tool in place. The sleeve preferably has a grip-enhancing cover 17. The connector means is attachable to a power tool or hand tool (not shown) via a tool mount 11. The connector means 15 has a longitudinal hole 12, which has a cross-section corresponding to the cross-section of the mounting portion of the tool. Thus, depending upon the embodiment of tool for which the holder is to be used, the longitudinal hole has at least one flat surface 13, the width of which corresponds to a 60 degree segment of the total hole cross-section. Two flat surfaces are shown in FIG. 10B, making the holder suitable for tools according to the second and third embodiments as described earlier. The part of the longitudinal hole which is not a flat surface is substantially circular in cross-section, to accommodate tools having a hex cross-section and tools similar to the earlier described fourth, fifth, sixth and seventh embodiments, but having two opposite flat surfaces arranged on the shank. The torque transfer between the holder and the tool is performed essentially by the contacting flat surfaces of the holder and the tool, respectively. The connector means includes at least one radial hole 22, which cooperates with a substantially spherical locking ball 21 movably arranged in the radial hole and which is prevented from fully entering the longitudinal hole 12 by a smaller diameter part 26 (bevelled end) of the radial hole 22. The locking ball cooperates with the circumferential groove 4 (as shown in FIGS. 1A to 9B) in the tool to lock the tool in place when the tool is fully inserted into the holder 10. The outer sleeve 14 is arranged to reciprocally slide over the connector means 15 between two end positions, and has a stepped inside diameter, having a smaller diameter part facing the tool mount 11 and a larger diameter part 25 facing the tool bit. A beveled transition 26 is arranged between the two different diameter parts. The bevelled transition is arranged to cooperate with at least one transition ball 23, which will be described in detail later. A sleeve biasing means 16, for example a coil spring, is arranged to bias the sleeve 14 away from the tool mount 11. The transition ball 23 is arranged in a transition hole 24 in the connector means 15. The transition hole is substantially radial, and preferably angled so that the bottom of the transition hole is arranged further from the tool mount 11 than the top of the transition hole. Alternatively, the transition hole is substantially perpendicular to the longitudinal hole 12. Thus, the transition ball 23, which has a diameter substantially corresponding to the diameter of the transition hole 24, is slidable between a first position at the bottom of the transition hole, to a second position protruding from the top of the transition hole. The beveled transition 26 is pressed against the transition ball 23 by the sleeve biasing means 16.

In FIG. 11A, a tool 1 is held in position to be inserted into the holder 10. The locking ball 21 is free to slide in the radial hole 22, because the larger diameter part 25 of the sleeve 14 is located adjacent the locking ball. The sleeve biasing means 16 is pressing the sleeve and the beveled transition 26 against the transition ball 23, which is thus forced to the bottom of the transition hole. The sleeve is held in this position by a mechanism comprising a locking cavity 20, which cooperates with a locking ring 19 arranged in a locking ring groove 18 arranged on the elongate connector means 15, to limit the stroke of the sliding movement of the sleeve along the elongate connector means in the direction towards the tool mount by the locking ring blocking further movement because the locking ring contacts the edge of the locking cavity (as shown in FIG. 11B), and in the direction towards the tool by the beveled transition 26 contacting the transition ball 23 in its position at the bottom of the transition hole, which protrudes enough to block the movement of the sleeve 14 when the bevelled transition contacts the larger diameter portion of the elongate connector means (see FIG. 11A). In the latter position, the sleeve is prevented from sliding towards the tool mount, under the biasing influence of the biasing means 16, by the frictional forces present between the inside of the sleeve and the locking ring 19.

As is shown in FIG. 11B, the tool 1 is inserted into the longitudinal hole 12. The inserted end of the tool will push the transition ball 23 radially outwards in the transition hole 24. The transition ball is pressed by the inserted end of the tool bit, from its position at the bottom of the transition hole towards the sleeve and the beveled transition 26, thus pressing the sleeve towards the tool mount. A locking portion 27 of the sleeve 14 effectively blocks the locking ball 21 from movement in the first radial hole 22, locking the tool 1 in the longitudinal hole 12.

To release the locking ball 21, the sleeve 14 is pressed towards the tool 1, starting to release the locking ball by sliding the locking portion 27 of the sleeve forwards. The beveled transition 26 will push the transition ball 23 towards the tool bit, to thereby start pushing the tool bit out of the longitudinal hole 12. The locking portion of the sleeve fully clears the locking ball, allowing the locking ball to slide up in the first radial hole 22 sufficiently to not protrude into the longitudinal hole 12. This allows the tool 1 to be fully removed from the longitudinal hole. The transition ball 23 is seated in the first position in the transition hole 24, blocking any further movement of the sleeve 14 in the direction towards the tool insertion hole (longitudinal hole). As soon as the tool has left the longitudinal hole, the locking ball can enter the longitudinal hole and thus release the sleeve 14 for sliding towards the tool mount 11, but the sleeve is prevented from sliding by the frictional forces between the sleeve and the locking ring, as described above. Thus, when inserting a tool bit into the holder, these frictional forces will have to be overcome by the user pushing the tool bit into the holder with a sufficient force to release the sleeve.

FIGS. 12A to 12C show the holder 10 according to the invention used with a standard size drill bit 100 having a hex mounting portion 101. All technical features of the holder are the same as earlier described and have the same reference numerals. The hex cross-section of the drill bit fits without problems in the longitudinal hole 12 of the holder, with the two flat surfaces 13 making contact with two opposite surfaces of the hex mounting portion and the corners between the remaining four hex flat surfaces making contact with the longitudinal hole's substantially circular surface. The mounting portion of the drill bit and its mounting groove 102 (corresponding to the groove 4 of the earlier described tools) interacts with the locking ball 21 and the transition ball 23 of the holder as has been described for FIGS. 10A and 10B. Thus, the holder according to the invention can be used together with either the earlier described tools or a standard size hex mounting portion drill bit.

FIGS. 13A to 13C show the holder 10 according to the invention used with a standard size screw bit 200 having a hex mounting portion 201 and a mounting groove 202. All technical features of the holder are the same as earlier described and have the same reference numerals. The hex cross-section of the drill bit fits without problems in the longitudinal hole 12 of the holder, with the two flat surfaces 13 making contact with two opposite surfaces of the hex mounting portion and the corners between the remaining four hex flat surfaces making contact with the longitudinal hole's substantially circular surface. The mounting portion of the drill bit and its mounting groove 202 (corresponding to the groove 4 of the earlier described tools) interacts with the locking ball 21 and the transition ball 23 of the holder as has been described for FIGS. 10A and 10B. Thus, the holder according to the invention can be used together with either the earlier described tools or a standard size hex mounting portion screw bit.

Figure 15:
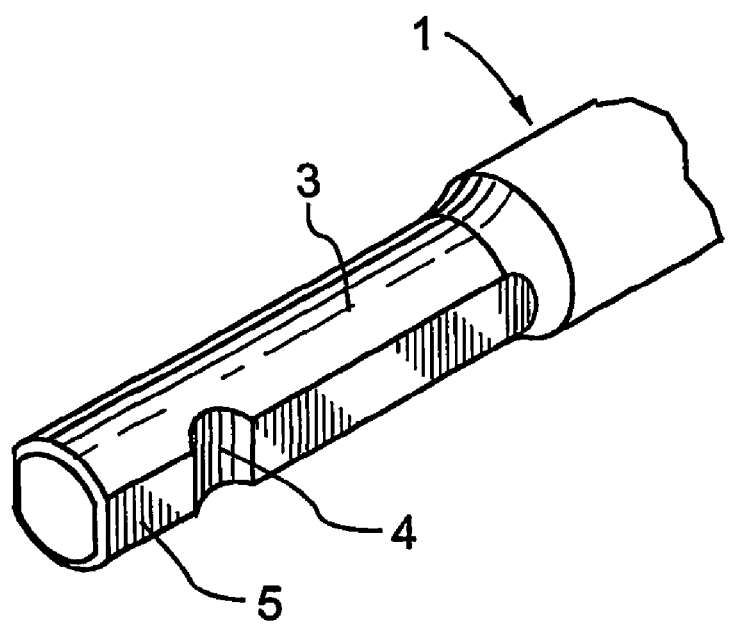
FIG. 15 is a perspective view of a mounting portion according to a further embodiment of the invention.

FIG. 14 shows in detail a further embodiment of a mounting portion 3 of a shank 2 of a tool 1 according to the invention. The groove 4 is arranged only on those portions of the shank which do not have the flat portions 5. Alternatively and as shown in FIG. 15, the mounting portion 3 of a shank 2 of a tool 1 according to the invention has a groove 4 arranged only on those portions of the shank which have the flat portions 5.

FIGS. 16A and 16B show a tenth embodiment of a mounting portion 3 of a shank 2 of a tool 1. The shank is generally square in cross-section along a major portion of the shank, with flat surfaces 5. The corners may be rounded or sharp. The flat surfaces are arranged to cooperate with special tool holders having a correspondingly shaped hole, for enhanced torque transfer between holder and tool. The flat surfaces 5 may correspond in width to a 60 degree section of the shank. An optional retention groove 4 is arranged towards the outer end of the mounting portion.

FIGS. 17A and 17B show an eleventh embodiment of a mounting portion 3 of a shank 2 of a tool 1. The shank is generally triangular in cross-section along a major portion of the shank, with flat surfaces 5 with sharp or rounded corners. The flat surfaces are arranged to cooperate with special tool holders having a correspondingly shaped hole, for enhanced torque transfer between holder and tool. The flat surfaces. 5 may correspond in width to a 60 degree section of the shank. An optional retention groove 4 is arranged towards the outer end of the mounting portion.

Figure 18A:
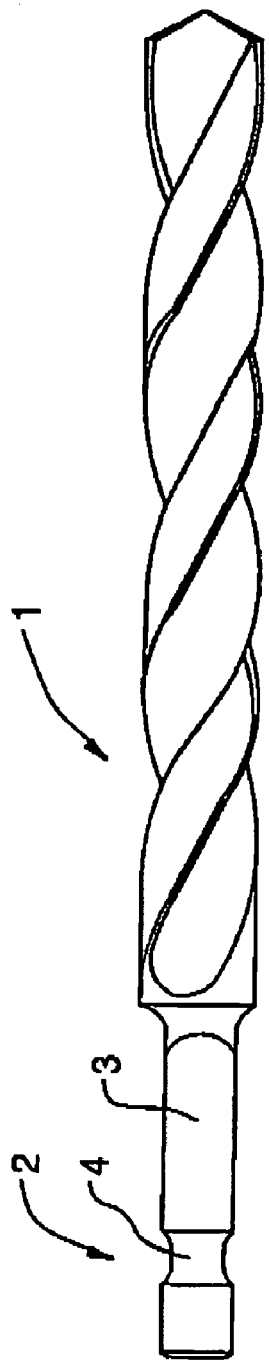
FIG. 18A is a side view of a twelfth embodiment of a tool having a mounting portion of a shank according to the invention.
Figure 18B:
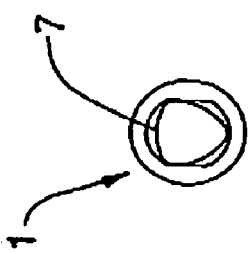
FIG. 18B is an end view of the tool of FIG. 18A.

FIGS. 18A and 18B show an eleventh embodiment of a mounting portion 3 of a shank 2 of a tool 1. The shank is generally triangular in cross-section along a major portion of the shank, with outwardly curved surfaces 7. The curved surfaces are arranged to cooperate with special tool holders having a correspondingly shaped, for enhanced torque transfer between holder and tool. An optional retention groove 4 is arranged towards the outer end of the mounting portion.

Figure 19A:
FIG. 19A is a side view of a thirteenth embodiment of a tool having a mounting portion of a shank according to the invention.
Figure 19B:
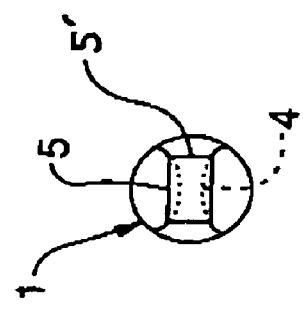
FIG. 19B is an end view of the tool of FIG. 19A.

A twelfth embodiment of a mounting portion 3 of a shank 2 of a tool 1 is shown in FIGS. 19A and 19B. This embodiment is similar to the third embodiment shown in FIGS. 3A and 3B. The shank is generally rectangular in cross-section, having two first flat portions 5 arranged opposite each other on the shank and two second generally flat portions 5' connecting the first flat portions. Each first flat portion 5 corresponds in width to a 60 degree section of the shank. An optional retention groove 4 is arranged towards the outer end of the mounting portion.

The tools as described, when applied to a drill bit, have a number of apparent advantages over the prior art known as two-piece drill bits. The two-piece construction has an ordinary substantially circular cross-section drill mounted in a longitudinal hole in a hex cross-section mounting piece.

The combination of a tool and holder according to any of the described embodiments of the invention adds safety to the use of the device, because the device automatically locks the tool bit in the holder after insertion. No action, other than the insertion itself, has to be performed by the user to insert and lock the tool bit in place. As a safeguard, the device has to be actively manipulated in order to release the tool bit from the holder again, but the tool bit will be automatically dislodged during this manipulation, so that the tool bit can be removed from the holder using only one hand.

It will be appreciated that the above description relates to the preferred embodiments by way of example only. Many variations on the invention will be obvious to those knowledgeable in the field, and such obvious variations are within the scope of the invention as described and claimed, whether or not expressly described. For example, irregular, i.e. non-symmetrical, cross-sections may be used for both the shank and the holder mounting hole. An L-shape or a triangular shape might be used, where at least one of the flat sides correspond to the flat of a standard hex bit/holder. Naturally, and this applies to all embodiments of the invention, the at least one flat side of the shank used for torque transfer may be substantially narrower than the corresponding flat of the holder mounting hole. The basic requirement of the shank/holder fit is that only a certain amount of lateral movement of the shank inside the holder is allowed, to accurately hold the tool during operation.

In the preceding description and in the accompanying claims, it is intended that expressions such as "generally triangular" or "generally rectangular" or "generally square" should mean that the shapes are essentially so, but may have somewhat rounded surfaces, corners and/or edges, which still suggesting the overall shape.

INDUSTRIAL APPLICABILITY

The invention provides tools having novel shanks for easy and secure mounting in tool holders.

The invention claimed is:

1. For use in a tool holder having an aperture with a cross-sectional shape having at least one non-circular 60-degree segment, a tool having a distal operative portion and a proximal shank with a mounting portion for mounting said tool in said aperture of said tool holder, said mounting portion comprising at least one cross section including circular and non-circular portions, said non-circular portion having at least one 60-degree segment configured for engagement in said aperture with said non-circular 60-degree segment of said aperture and wherein each circular portion has a common centre of axis with the tool;

wherein there are two said 60-degree segments, each having a flat surface, said two segments being on opposite sides of said mounting portions from each other.

2. A tool as recited in claim 1, wherein a portion of said mounting portion has a circumferential groove extending at least partway around the mounting portion, adapted to receive locking means of said holder.

3. A tool as recited in claim 1, wherein a portion of said mounting portion has a circumferential groove extending at least partway around the mounting portion, adapted to receive locking means of said holder.

4. A combination of a tool and a tool driver having a holder with a distal axial aperture for receiving said tool, said tool having a distal operative portion and a proximal shank with a mounting portion for mounting said tool in said holder, said mounting portion comprising at least one cross section including circular and non-circular portions, said non-circular portion having at least one 60-degree segment configured for engagement in said aperture with a non-circular 60-degree segment of said aperture and wherein each circular portion has a common centre of axis with the tool, said aperture having a cross-sectional shape having a 60-degree segment for each of said 60-degree segments of said mounting portion, shaped correspondingly to each said non-circular segment of said mounting portion wherein there are two said 60-degree segments, each having a flat surface, said two segments being on opposite sides of said mounting portions from each other;

wherein said mounting portion has two said 60-degree segments having segment ends joined by a flat surface, said two segments being on opposite sides of said mounting portion from each other.

5. A combination as recited in claim 4, further comprising locking means for locking said tool in said holder.

6. A combination as recited in claim 5, wherein said locking means comprises manually operated engagement means for locking said mounting portion in said holder.

7. A combination as recited in claim 5, wherein said locking means comprises engagement means which automatically lock said mounting portion in said holder, upon insertion of a tool in said holder.

8. A combination as recited in claim 5, wherein said locking means comprises a locking ball mechanism.

* * * * *